Patented Jan. 22, 1924.

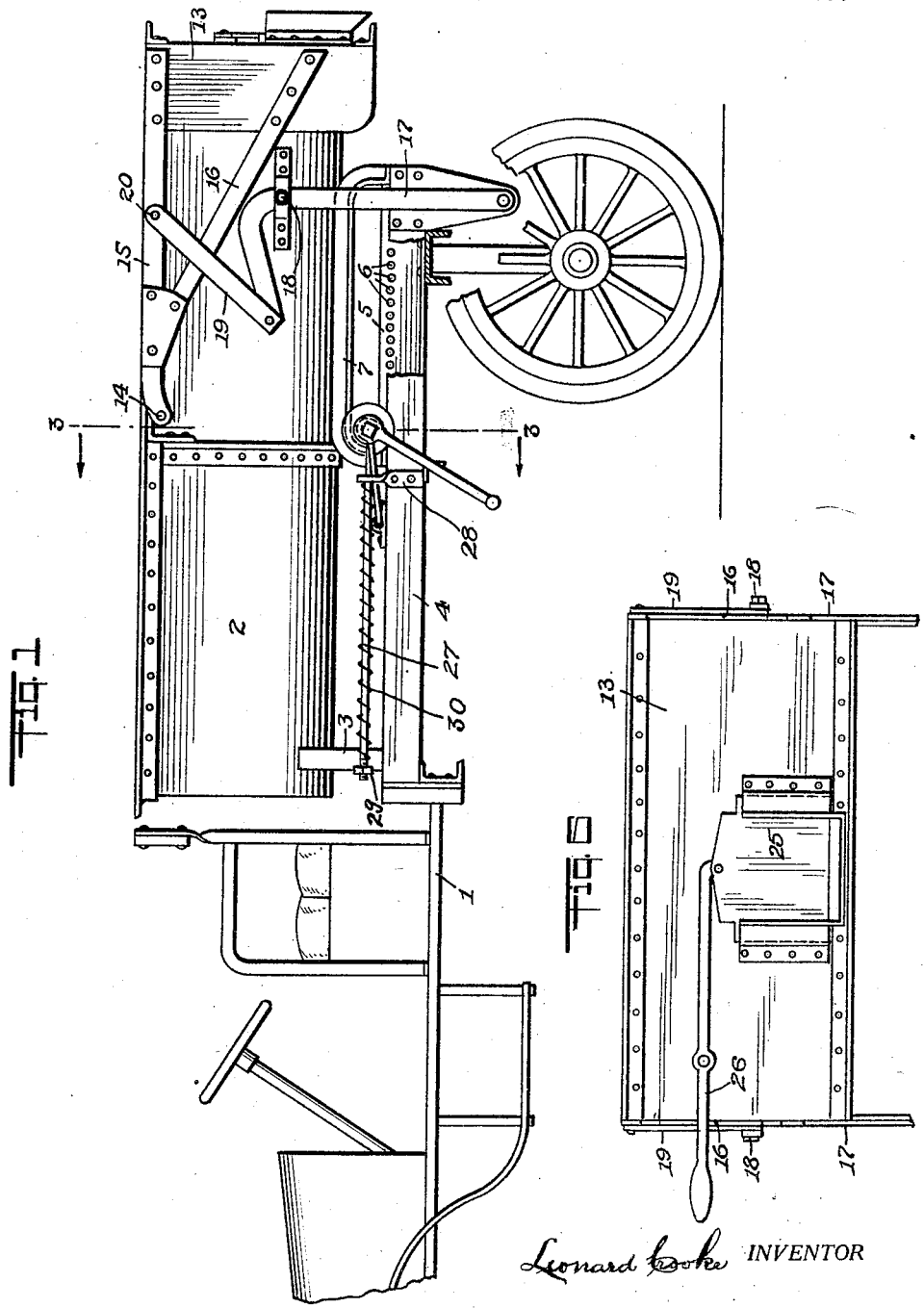

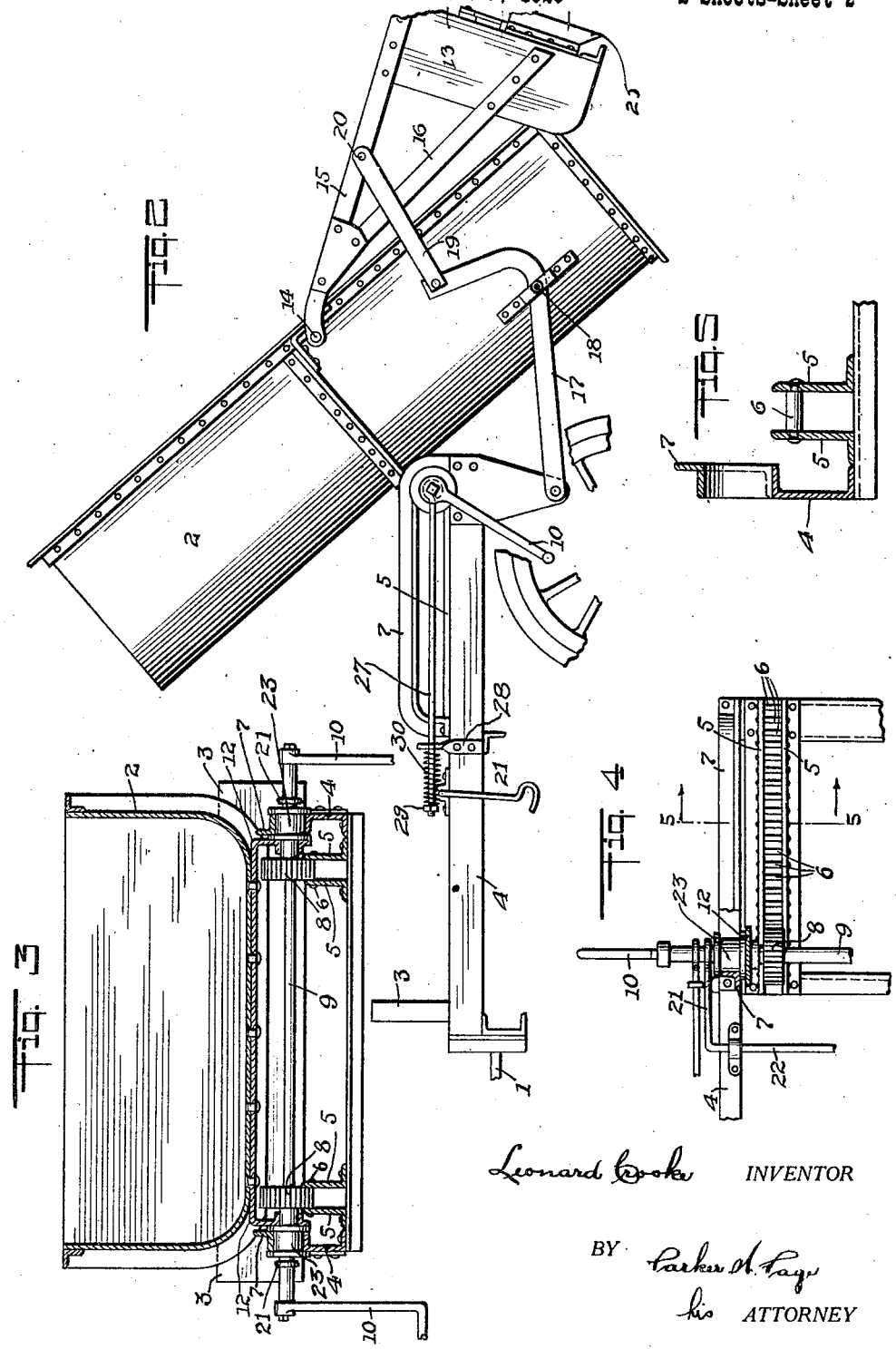

1,481,538

UNITED STATES PATENT OFFICE.

LEONARD CROOKE, OF HAGERSTOWN, MARYLAND.

DUMPING TRUCK.

Application filed February 1, 1923. Serial No. 616,238.

*To all whom it may concern:*

Be it known that I, LEONARD CROOKE, a subject of the King of Great Britain, residing at Hagerstown, in the county of Washington and State of Maryland, have invented certain new and useful Improvements in Dumping Trucks, of which the following is a full, clear, and exact description.

The invention which forms the subject of this application for Letters Patent is an improvement in dumping trucks, or generally, in vehicles provided with a rearwardly movable body which may be tilted when forced backward on the frame upon which it rests, to dump its contents. Such vehicles are not broadly new, but the device which is hereinafter described and claimed is characterized by improvements in construction and in its details, which render it more efficient, easier of control and operation and more desirable for general use.

The improvements which are embodied in my improved device may be generally described as comprising the following: The truck body, aside from a seat or saddle on the frame in which its forward end rests when in normal position, is supported by single center roller bearings surrounding a shaft which carries pinions near its ends which engage with fixed racks on the vehicle frame and is journalled in brackets attached to the body. This shaft is provided with a crank at one or at both ends by which it and the pinions fast to it are revolved and the body thereby moved backward and caused to tilt up to dump its contents. The pinion or bearing shaft is retained and caused to follow a horizontal path by guide bars or rails over the rolls or wheels.

Another improvement resides in a system of levers connected to the frame and the tail board respectively, which on the rearward movement of the body raise the said tail board in proportion to the position of the body relatively to the frame to permit the contents of the body to be shovelled out before the body tilts up or becomes completely discharged after the body is tilted.

These improvements are illustrated in the accompanying drawings in which:

Fig. 1 is a view in side elevation of the complete vehicle with my improvements attached thereto.

Fig. 2 is a similar view of a portion of the same showing the body in its tilted or dumping position.

Fig. 3 is a cross-section on line 3—3 of Fig. 1.

Fig. 4 is a plan and Fig 5 a section on line 5—5 of Fig. 4 of one of the rack bars and attached parts; and Fig. 6 is a rear view of the body.

The character of the vehicle as a whole and the nature of the frame, or of the body, are not of the essence of the invention. I have selected as typical of these an automotive truck frame 1 and a common form of metallic body 2. It is desirable that the frame be provided with a seat or saddle 3 upon or in which the forward end of the body rests when the latter is in its normal position.

Mounted on the frame 1 is a framework with parallel sides to which is secured a pair of rack bars. These racks, in lieu of being solid castings as is usual in such cases, are composed of side plates or angle irons 5 with pins 6 riveted thereto as shown in Fig. 5, which latter form the teeth of the bars, and leave open spaces in said bars through which dirt and rubbish will fall instead of collecting on and clogging up the teeth as would result if the ordinary solid rack bars were employed.

Two rollers 23 on a cross-bar 9 have above them a guide plate, bar, or rail 7 of approximately the same length as the rack bars, and these bars serve to retain in engagement with the rack bars, the two pinions 8, on the cross-bar 9, provided at one or both ends with cranks 10 by which it is rotated, when so desired. The pinions 8 are fast to the shaft 9, and normally engage with the rack bar 5. Plates or brackets 12 attached to the body afford bearings for the rod or shaft 9, and secure the same to the body. The rolls 23 are loose on the shaft and run on side tracks 4 secured to or forming a part of the frame. These rolls afford a bearing for the body.

The tail-board 13 of the body is pivotally connected to the body at 14 by side bars or plates 15 and 16. Bell-crank levers 17, pivoted to the plates at the rear corners of the frame-work are pivoted, at 18 to the sides of the body and their horizontally extending arms are connected by links 19 to the bars 15 at 20. From this construction it follows that as a crank 10 is turned and the body moved backward, the horizontal arms of the bell-crank levers 17 are raised, with the result of raising the side bars 15 and consequently the tail-board relatively to the body.

If the crank be but slightly turned so the rear movement of the body is small in amount, the tail-board is partially raised and an opening provided through which the contents of the body may be discharged by a shovel if it be desired to partially remove the contents without completely dumping them. Or a gate 25 may be provided in the tail-board and opened by a hand-lever 26 to discharge limited amounts of the load, such as bags of coal. This may be done without moving the body backward.

Latches 21, on a cross-rod 22, are pivoted to the frame-work 4 and are adapted to engage the shaft 9 and prevent its movement, normally, in either direction, and to limit the rearward movement of the body rods 27 are connected, preferably at both sides of the truck, to the shaft 9 and slide through brackets 28 on the frame. These rods are provided with nuts 29 which are adjustable to regulate the rearward movement of the body and are surrounded by springs 30 which are used to take up any shocks.

The most salient feature of this device is its maximum of simplicity. There is but a single bearing for the truck body which, by its rotation, is moved forward or back to dump or replace the body, while the tail-board and its operative parts are not only extremely simple but provide for all uses of the device which in practical use are likely to arise.

What I claim is:—

1. In a dumping truck or vehicle, the combination with a body and frame, of a pinion shaft journalled in bearings attached to the central part of the body and forming the axis about which the body turns when tipped, and parallel rack bars mounted on the frame with which pinions on said shaft engage and means for retaining the pinions in engagement with the rack bars at all times.

2. In a dumping truck or vehicle, the combination with a body and frame, of a pinion shaft journalled in bearings attached to the central part of the body, and constituting the axis around which the body turns when tipped, rollers carried by the said shaft and turning on guide rails on the frame, parallel rack bars carried by the frame with which pinions on the said shaft engage, and means for maintaining the same in engagement with the said rack bars.

3. In a dumping truck or vehicle the combination with the frame of parallel side rack bars, and parallel side retaining guide bars, of a pinion shaft journalled in bearings attached to the body at its central point and constituting the axis around which the body turns when tipped, and having pinions enmeshing with the said rack bars, rolls loose on said shaft and guide-rails upon which they are adapted to run, said shaft being retained in proper position by the guide bars, and means for rotating said shaft.

4. In a dumping truck or vehicle the combination with a frame, a body movable longitudinally thereon, and means for forcing said body forward and back, of bell-crank levers pivoted to the frame, a tail-board pivoted to the body by side bars and links connecting the horizontally and rearwardly extending arms of said bell-crank levers to the said side bars, whereby the tail-board is raised in relation to the body in proportion to the extent of the rearward movement of the body on the frame.

In testimony whereof I hereto affix my signature.

LEONARD CROOKE.